(12) United States Patent
Irving

(10) Patent No.: US 9,310,275 B1
(45) Date of Patent: Apr. 12, 2016

(54) LAUNCH CABLE ASSEMBLY, KIT AND METHOD

(71) Applicant: FiberNext, LLC, Concord, NH (US)

(72) Inventor: Ryan M. Irving, Belmont, NH (US)

(73) Assignee: Fiber Next, LLC, Concord, NH (US)

( * ) Notice: Subject to any disclaimer, the term of this patent is extended or adjusted under 35 U.S.C. 154(b) by 0 days.

(21) Appl. No.: 14/453,055

(22) Filed: Aug. 6, 2014

Related U.S. Application Data

(60) Provisional application No. 61/863,002, filed on Aug. 7, 2013.

(51) Int. Cl.
*G02B 6/00* (2006.01)
*G01M 11/00* (2006.01)
*G02B 6/44* (2006.01)

(52) U.S. Cl.
CPC ............... *G01M 11/33* (2013.01); *G02B 6/444* (2013.01); *G02B 6/4457* (2013.01)

(58) Field of Classification Search
CPC ...... G01M 11/33; G02B 6/444; G02B 6/4457

USPC ......................................................... 385/135
See application file for complete search history.

(56) References Cited

U.S. PATENT DOCUMENTS

| | | | |
|---|---|---|---|
| 7,016,024 B2 * | 3/2006 | Bridge | G01M 11/3109 356/73.1 |
| 8,711,341 B2 * | 4/2014 | Blair | G01M 11/3136 356/73.1 |
| 2007/0025676 A1 * | 2/2007 | Russell | G01M 11/3136 385/134 |

* cited by examiner

*Primary Examiner* — Ryan Lepisto
(74) *Attorney, Agent, or Firm* — Michael J. Persson; Catherin E. Napjus; Lawson Persson & Waldor-Franke

(57) ABSTRACT

A launch cable assembly for use with an MPO switch and OTDR to test a multi-fiber cable, which includes a mandrel around which is wrapped between twenty-five and two hundred feet of multiple fiber optic strands, where the mandrel and fiber optic strands are housed within a housing, the fiber optic strands are in optical communication with a port in the housing, the fiber optic strands exit the housing from a fiber exit in the housing, and the fiber optic strands terminate in an assembly connector, which is preferably a standard MPO connector.

19 Claims, 3 Drawing Sheets

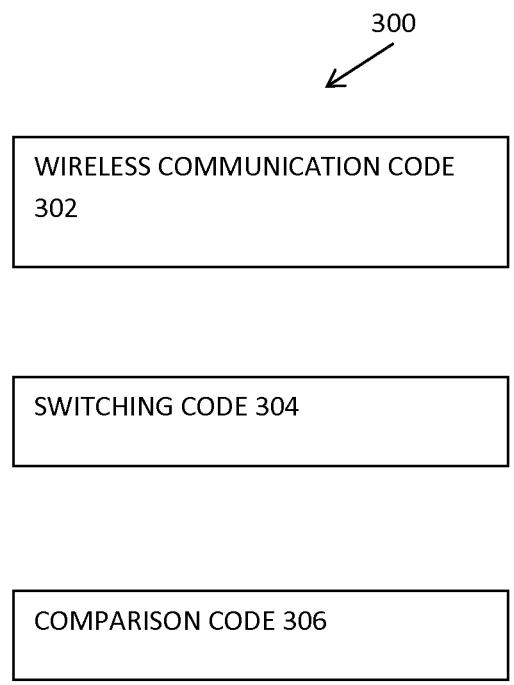

LAUNCH CABLE ASSEMBLY, KIT AND METHOD

CLAIM OF PRIORITY

This application claims the benefit of priority of U.S. Provisional Patent Application Ser. No. 61/863,002, filed on Aug. 7, 2013.

FIELD OF THE INVENTION

The present invention relates to fiber test equipment, and in particular, to an improved launch cable assembly for use with an MPO switch and an OTDR.

BACKGROUND

An optical time-domain reflectometer (OTDR) is a useful tool for testing point-to-point fiber optic links, testing passive optical networks (PONs), and finding faults, such as breaks and measure reflectance or optical return loss (ORL) in fiber optic networks. The OTDR generates output pulses and measures the return signal from the same end of the fiber network under test.

A current standard method for using an OTDR to test a multi-fiber cable 32 terminating in an MPO connector 34 is illustrated in FIG. 2A. The MPO connector 34 is plugged into a breakout assembly 100 that optically connects each fiber strand within the multi-fiber cable 32 with a separate optical fiber strand 102 within the breakout assembly 100. These optical fiber strands 102 within the breakout assembly 100 then emerge from the other side of the breakout assembly 100 and each strand 102 ends in a single fiber connector 104 after a short distance from their exit from the breakout assembly 100. An OTDR cable 106 as long as 500 feet may extend from an OTDR 50 and end in a port 108 that accepts the single fiber connector 104 that terminates each of the fiber strands 102 extending from the breakout assembly 100. A user would plug the MPO connector 34 of the multi-fiber cable 32 being tested into the breakout assembly 100; plug the single fiber connector 104 into the port 108 of the cable 106 extending from the OTDR 50; and then operate the OTDR 50.

The user would repeat this process for all of the strands extending from the breakout assembly. This may be as few as two, and as many as twenty-four or more. The user must be careful to not mix up the strands that have been tested with those that haven't, and keep careful track of which strand is which so the user knows which strand within the multi-fiber cable is being tested. This is an unwieldy and confusing assembly and process. Moreover, because of the short distance between the connection of the multi-fiber cable 32 being tested with the breakout assembly 100 and the connection of the single fiber connector 104 with the OTDR cable 106, the OTDR 30 cannot accurately test the connector loss of the end MPO connector 34 of the multi-fiber cable 32 under test that is connected to the breakout assembly 100. Because the connector 34 under test and the single fiber connector 104 are so close in distance, the OTDR will read the connector loss of both connections as one big loss, and it is impossible to attribute the correct amount of that loss to the test connector 34 alone. In essence, the OTDR 30 cannot "see" that end connector 34 of the cable under test 32 when it is so close to another connection, such as single fiber connector 104. One solution to this problem might be to make the fiber strands 102 extending from the breakout assembly 100 at least 100 feet long. This would only make the already unwieldy assembly more unwieldy, however.

Current art does have a solution to the problem of having to check each strand extending from the breakout assembly, strand by strand, in the correct order. All of the strands extending from the breakout assembly may be brought back together to terminate in an MPO connector that is then plugged into an MPO switch, which is connected to the OTDR. The MPO switch can automatically direct the pulses coming from the OTDR into the separate strands, so that the user may test each of the individual strands of the multi-fiber cable connected to the breakout assembly without having to physically connect, strand by strand. Not only is this time-saving and less confusing, but it also avoids connector damage from repeated connecting and disconnecting. The use of an MPO switch does not solve the problem of the OTDR not being able to see the end connector of the multi-fiber cable under test, however.

Therefore, there is a need for an improved assembly that is both easy to use and that allows the OTDR to test the end connector of a cable under test.

SUMMARY OF THE INVENTION

The present invention is a launch cable assembly, kit, method, and software product.

In its most basic form, the launch cable assembly includes a mandrel within a housing that includes at least one cable port, and at least two fiber optic strands of at least 25 feet in length wrapped around the mandrel, where the first end of the strands is in optical communication with the inner side of the port on the inside of the housing, and where the second end of the strands extends out of the housing and is grouped together to terminate in a standard connector, which is preferably an MPO connector. The outer side of the port is designed to accept any standard fiber optic cable connector, particularly MPO connectors. The fiber optic strands are arranged in optical communication with the port on the inside of the housing so that when a multi-fiber optic cable terminating in an MPO connector is plugged into the port, light traveling through the fiber optic strands within the housing will continue traveling through the fiber optic strands within the multi-fiber cable plugged into the port, and vice versa.

In preferred embodiments of the launch cable assembly, the at least two fiber optic strands are twelve fiber optic strands and the multi-fiber optic cable that is plugged into the port is a twelve fiber optic cable. In an alternate preferred embodiment of the launch cable assembly, the at least two fiber optic strands are twenty-four fiber optic strands and the multi-fiber optic cable that is plugged into the port is a twenty-four fiber optic cable. It is understood that there may also be more than twenty-four strands. The two to twenty-four fiber optic strands wrapped around the mandrel may be enclosed in a loose tube cable or a ribbon cable, although loose tube cable is preferred as the inventor has found that it is difficult to get the ribbon cable to route properly in this application. In addition, loose tube cable has more capacity than ribbon cable, and has longer length in a smaller space. Having the fibers completely loose, i.e. not encapsulated in any cable, is preferred over both loose tube cable and ribbon cable, however. The strands are organized so that their ends connect with the port on one end and into an MPO connector on the other end, and wrapped around the mandrel in the middle.

Although the length of the strands is at least 25 feet, it is preferred that the length be at least 100 feet, so that the end connector is clearly visible to the OTDR, and separate from a connection to an MPO switch, as explained below. Some preferred embodiments include strands with lengths of 120 and 200 feet, respectively. It is understood that in some embodiments, the strands are longer than 200 feet. The shape of the mandrel cross-section is preferably circular, ovular, or elliptical, but may be any other shape, so long as the shape has rounded corners. The housing is made of any material strong enough to support the mandrel and the fiber strands housed within, such as plastic, and is sized and shaped to fit around the mandrel and fibers without too much extra room within.

In some embodiments of the launch cable assembly, the housing includes more than one port. With such embodiments, more than one type of cable may be tested using the same launch cable assembly. The cable types may vary in terms of the number of optical strands contained within the cable, as well as in terms of the type of connector with which the cable is terminated. The housing may include one port that is optically connected to twelve optical strands, as discussed above, and that port is used for testing twelve fiber cables. Another port may be optically connected to twenty-four, six, or two strands, for use with multi-fiber cables with that number of optical fibers within. In addition, the housing may include a port connected to a single fiber, for use with single fiber cables. The housing may also include ports that may accept different types of connectors, such as one port that accepts MPO connectors, and one port that accepts a different type of standard connector. The housing may include ports for each of these options or any combination thereof. It is understood that for every port, additional fiber strands are wrapped around the mandrel within the housing, and an additional set of fiber strands terminating in a connector will also be included extending from the housing.

In its most basic form, the kit of the present invention includes the launch cable assembly of the present invention as described above and an MPO switch, such as those sold under trademarks FIBERNEXT. The MPO switch includes a port for accepting an MPO connector of a multi-fiber cable under test and is connectable to any OTDR so that the OTDR may send pulses through each of the fiber strands within the multi-fiber cable under test. A basic MPO switch includes software and a user interface that allows a user to switch between fiber strands to test. More advanced MPO switches may have additional functionality, such as controls for the OTDR, displays, functionality concerning the various settings and test results of the OTDR, and the like. The MPO switch may be used with single- or multi-mode fibers; MPO or SC connectors; and ribbon or loose fiber cables.

In some embodiments, the kit of the present invention also includes an OTDR usable or integrated with the MPO switch. The OTDR may be any OTDR commonly used in the art. The OTDR and MPO switch are connected by a preferably short cable. It is preferred that the cable be short so that the OTDR does not see the connection of the assembly connector to the MPO switch or any connectors between the MPO switch and the OTDR. Some embodiments include two cable launch assemblies as described above, two MPO switches, and two OTDRs, for use on either end of the multi-fiber cable to be tested. Some embodiments include the multi-fiber cable to be tested. In such embodiments including two of each element, the two MPO switches preferably include wireless communication capabilities so that they may communicate information between one another during testing.

In its most basic form, the method of the present invention includes the following steps to be taken by someone performing a test on a multi-fiber cable: plugging the end connector of the multi-fiber cable under test into the port of the launch cable assembly of the present invention; plugging the assembly connector of the launch cable assembly into an MPO switch; connecting the MPO switch to an OTDR; and using the interface on the MPO switch to switch between each fiber strand until all fiber strands have been tested. In some embodiments, the method of the present invention also includes the following steps: plugging the second end connector of the multi-fiber cable under test into the port of a second launch cable assembly of the present invention; plugging the assembly connector of the second launch cable assembly into a second MPO switch; and connecting the second MPO switch to a second OTDR. In such latter embodiments of the method, one side may test one half of the strands, and the other side may test the other half of the strands, so that the entire test would take half the time. Alternatively, as a redundancy measure, both sides may test all strands so that the tests on a single strand from different ends of the strand may be compared to ensure consistent, accurate test readings.

In its most basic form, the software product of the present invention is stored on a computer readable medium and executable by a processor within an MPO switch. The software product includes a wireless communication code for allowing a pair of separate MPO switches to exchange information with each other wirelessly and a switching software code for switching between fiber strands. The software product allows a pair of MPO switches to communicate with one another as to which fiber strands within a multi-fiber cable under test have been tested so that each MPO switch tests half of the strands and the test of the entire cable may be performed in half the time. In some embodiments, the software product also includes a comparison software code for comparing results of tests performed on the same fiber strand from each end of the cable by each of the MPO switches.

These aspects of the present invention are not meant to be exclusive and other features, aspects, and advantages of the present invention will be readily apparent to those of ordinary skill in the art when read in conjunction with the following description and accompanying drawings.

BRIEF DESCRIPTION OF THE DRAWINGS

FIG. 4 is a block diagram of the functionality of the software product of the present invention.

DETAILED DESCRIPTION

Figure 1:
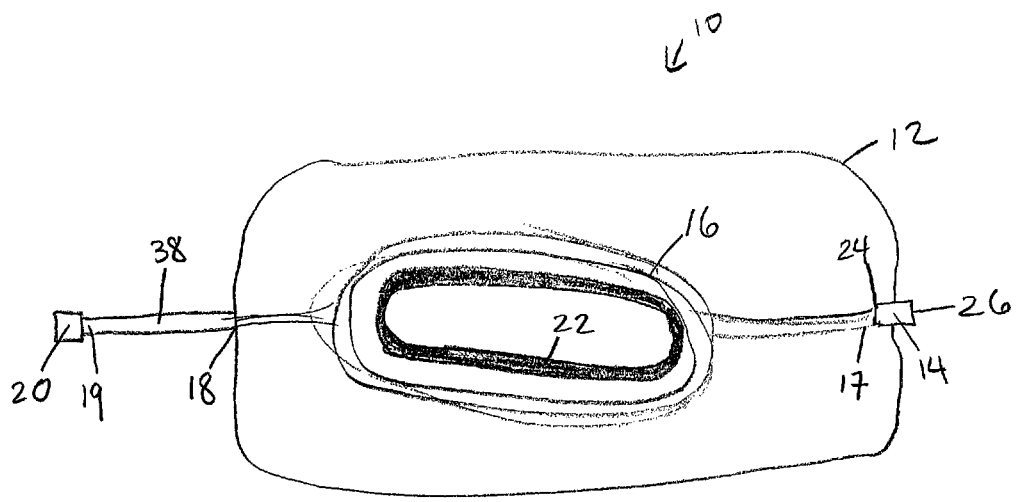
FIG. 1 is a cross-section view of a launch cable assembly of the present invention.

Referring first to FIG. 1, a cross-sectional view of launch cable assembly 10 of the present invention is provided. Launch cable assembly 10 includes housing 12 with cable port 14 and fiber exit 18. Housing 12 is shown as being ovular in shape, but it is understood that the shape and size of the housing 12 will be similar to, but slightly larger than, the shape and size of mandrel 22. Cable port 14 has outer side 26 on the outside of housing 12 that accepts first MPO connector 34 of a multi-fiber cable 32 under test, as shown in FIG. 2B. Cable port 14 has inner side 24 on the inside of housing 12 that is in optical communication with fiber strands 16. Fiber strands 16 are between twenty-five and two hundred feet long and are wrapped around mandrel 22. Fiber strands 16 have first ends 17 where they are in optical communication with inner side 24 of port 14, and second ends 19 where they gather into second connector 20. Mandrel 22 is shown as elliptical, but it is understood that mandrel 22 may also be circular, ovular, or any shape that has rounded edges. Fiber strands 16 exit the housing 12 through fiber exit 18. From there, fiber strands 16 are wrapped in a tube 38 to protect the fiber strands 16 and to provide a less unwieldy assembly 10. It is understood that in some embodiments, tube 38 is omitted. Fiber strands 16 wrapped in tube 38 terminate in second connector 20.

The number of fiber strands 16 is equal to the number of optical fibers within the multi-fiber cable 32 under test. The fiber strands 16 are connected to the inner side 24 of port 14 such that light traveling through the optical fiber strands of the cable 32 will also travel through fiber strands 16 of the launch cable assembly 10, and vice versa. Preferred embodiments include twelve or twenty-four fiber strands 16 for use with twelve or twenty-four fiber cables 32 under test.

Figure 2A:
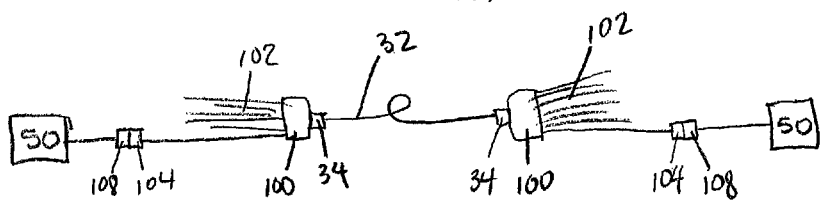
FIG. 2A is a diagram of a prior art set up for using an OTDR to test a multi-fiber cable.
Figure 2B:
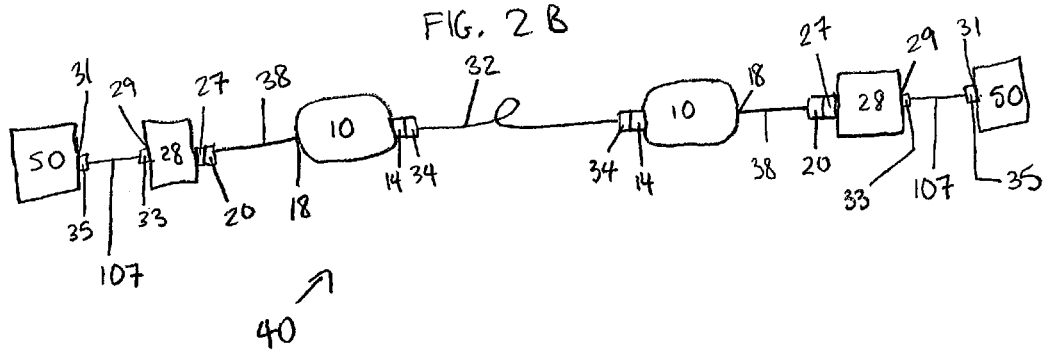
FIG. 2B is a diagram of the kit of the present invention.

Now referring to FIGS. 2A and 2B, diagrams for systems using OTDR 50 to test multi-fiber cable 32 are provided. FIG. 2A is a prior art system as described above. The system is shown with breakout assemblies 100 and OTDRs 50 on either side of cable 32 to be tested. FIG. 2B is a kit 40 of the present invention, including launch cable assembly 10, MPO switch 28, and OTDR 50 on either side of cable 32 to be tested. First MPO connector 34 of cable 32 mates with cable port 14 on housing 12 of launch cable assembly 10. This puts the fibers within cable 32 in optical communication with fiber strands 16, as shown in FIG. 1. After one hundred feet of fiber strands 16 are wrapped around mandrel 22, as shown in FIG. 1, fiber strands 16 exit housing 12 through fiber exit 18 and are encapsulated in tube 38 until they terminate in second connector 20, which is preferably also a standard MPO connector. Second connector 20 plugs into MPO switch 28 at switch port 27, which is, in turn, connected to OTDR 50 through MPO-OTDR cable 107. MPO-OTDR cable 107 has MPO switch connector 33 that plugs into MPO switch input 29 on MPO switch 29, and OTDR connector 35 that plugs into OTDR input 31 on OTDR 50. This is a preferred method of connecting MPO switch 28 and OTDR 50, but it is understood that this connection may be by any means commonly used in the art. OTDR 50 generates pulses that are launched into MPO-OTDR cable 107, through MPO switch 28, into one of the fiber strands 16, and then into the individual fibers of multi-fiber cable 32. MPO switch 28 switches which fiber strands 16 has the pulse from OTDR 50 launched into it, so that all fiber strands 16 have a pulse launched into them. Thus, all fiber strands 16 within multi-fiber cable 32 are, in turn, tested.

The embodiment shown in FIG. 2B shows launch cable assemblies 10, MPO switches 28, and OTDRs 50 on either end of multi-fiber cable 32. This allows half of the fibers to be tested from one end, and the other half from the other end, so that a test of all fibers is completed in half the time. Alternatively, all fibers may be tested from both sides to ensure consistent test results across all fibers.

Figure 3:
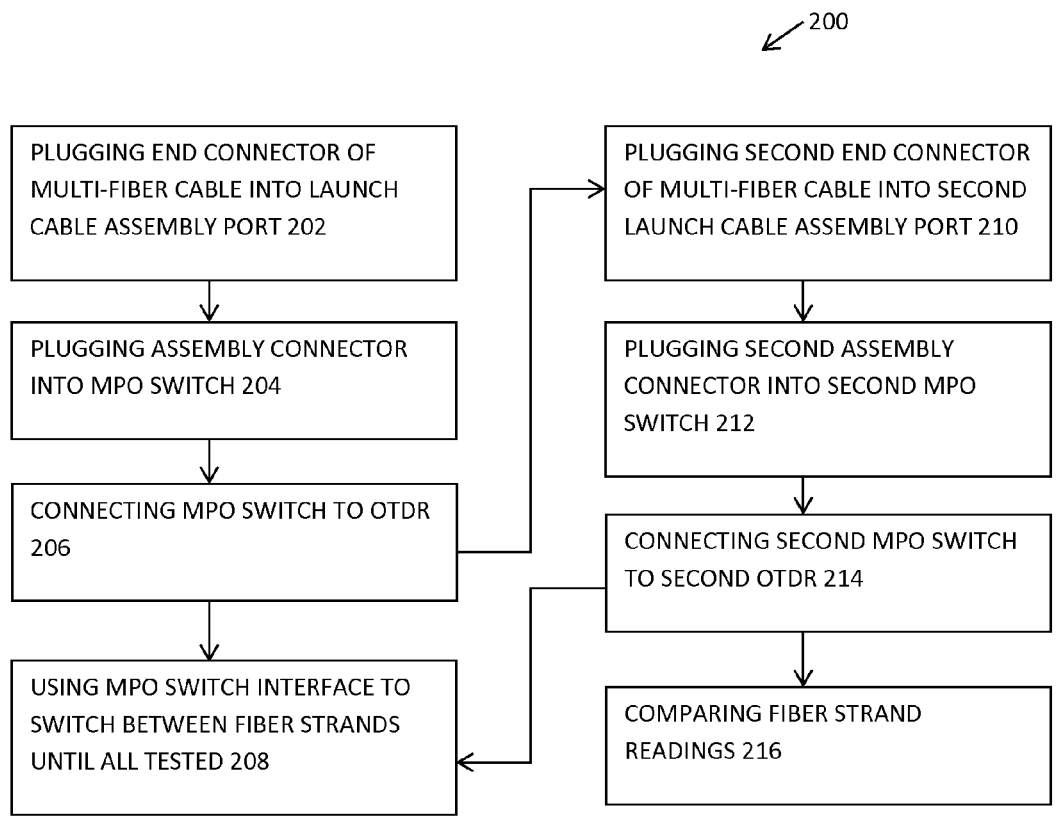
FIG. 3 is a flowchart of the method of the present invention.

Now referring to FIG. 3, the steps of method 200 are shown in a flow chart. On the left, the steps of method 200 in its most basic form are shown: plugging the end connector of the multi-fiber cable under test into the port of the launch cable assembly of the present invention 202; plugging the assembly connector of the launch cable assembly into an MPO switch 204; connecting the MPO switch to an OTDR 206; and using the interface on the MPO switch to switch between each fiber strand until all fiber strands have been tested 208. On the right, the steps of an expanded method 200 are shown. This method may be used with the kit 40 shown in FIG. 2B, with launch cable assemblies 10, MPO switches 28, and OTDRs 30 on either end of multi-fiber cable 32. The additional steps are: plugging the second end connector of the multi-fiber cable under test into the port of a second launch cable assembly of the present invention 210; plugging the assembly connector of the second launch cable assembly into a second MPO switch 212; and connecting the second MPO switch 212 to a second OTDR 214. On either the right or the left, the final step is switching between fibers until all are tested 208. On the right, there may be the additional step of comparing test results of the same fiber taken at different ends 216.

Now referring to FIG. 4, a block diagram of the functionality of the software product 300 of the present invention is provided. The software product 300 includes wireless communication code 302 for allowing a pair of separate MPO switches to exchange information with each other wirelessly and switching software code 304 for switching between fiber strands. The software product 300 allows a pair of MPO switches to communicate with one another as to which fiber strands within a multi-fiber cable under test have been tested so that each MPO switch tests half of the strands and the test of the entire cable may be performed in half the time. In some embodiments, the software product 300 also includes comparison software code 306 for comparing results of tests performed on the same fiber strand from each end of the cable by each of the MPO switches.

Although the present invention has been described in considerable detail with reference to certain preferred versions thereof, other versions would be readily apparent to those of ordinary skill in the art. Therefore, the spirit and scope of the description should not be limited to the description of the preferred versions contained herein.

What is claimed is:

1. A launch cable assembly for testing a multi-fiber optic cable containing at least two fiber optic strands and terminating in a first connector, comprising:
   a housing;
   a mandrel disposed within said housing;
   at least one cable port comprising an inner side and an outer side, wherein said at least one cable port is disposed through said housing such that the first connector of the multi-fiber optic cable is able to be connected to said outer side of said at least one cable port, and said inner side of said at least one cable port is within said housing;
   at least one fiber exit disposed in said housing; and
   at least one set of at least two fiber optic strands of at least twenty-five feet in length, wrapped around said mandrel within said housing, wherein each of said at least two fiber optic strands comprises a first end in optical communication with said inner side of said at least one cable port and a second end grouped together with each of said second ends of said at least two fiber optic strands such that each of said second ends of said at least two fiber optic strands terminates in a single second connector;
   wherein said at least one set of at least two fiber optic strands extend through said at least one fiber exit such that said second connector is outside of said housing; and
   wherein said at least two fiber optic strands are arranged in optical communication with said inner side of said at least one cable port such that when the first connector of the multi-fiber optic cable is connected to said outer side of said at least one cable port, light traveling through each of said at least two fiber optic strands will continue traveling through the at least two fiber optic strands within the multi-fiber optic cable whose first connector is connected to said outer side of said at least one cable port, and light traveling through each of the at least two fiber optic strands within the multi-fiber optic cable connected to said outer side of said at least one cable port will continue traveling through said at least two fiber optic strands.

2. The launch cable assembly as claimed in claim 1, wherein said at least two fiber optic strands are at least one hundred feet long.

3. The launch cable assembly as claimed in claim 1, wherein:
the first connector of the multi-fiber optic cable is an MPO connector;
said outer side of said at least one cable port is designed to accept an MPO connector; and
said second connector is an MPO connector.

4. The launch cable assembly as claimed in claim 1, wherein the multi-fiber optic cable contains twelve fiber optic strands and said at least two fiber optic strands are twelve fiber optic strands.

5. The launch cable assembly as claimed in claim 1, wherein the multi-fiber optic cable contains twenty-four fiber optic strands and said at least two fiber optic strands are twenty-four fiber optic strands.

6. The launch cable assembly as claimed in claim 1, wherein said at least two fiber optic strands are enclosed in a loose tube cable.

7. The launch cable assembly as claimed in claim 1, wherein said mandrel has a cross-section shape that is one of a group consisting of elliptical, ovular, and circular.

8. The launch cable assembly as claimed in claim 1, wherein:
said at least one cable port is at least a first and second cable port;
said at least one set of at least two fiber optic strands is at least a first and second set;
said outer side of said first cable port is designed to accept an MPO connector;
said inner side of said first cable port is in optical communication with said first ends of said first set of said at least two fiber optic strands;
said second connector of said first set of said at least two fiber optic strands is an MPO connector;
said outer side of said second cable port is designed to accept a type of connector other than an MPO connector;
said inner side of said second cable port is in optical communication with said first ends of said second set of said at least two fiber optic strands; and
said second connector of said second set of said at least two fiber optic strands is of the same type of connector as said outer side of said second cable port is designed to accept.

9. The launch cable assembly as claimed in claim 1, wherein:
said at least one cable port is at least a first and second cable port;
said at least one set of at least two fiber optic strands is at least a first and second set;
said first set of at least two fiber optic strands contains a first number of fiber optic strands;
said second set of at least two fiber optic strands contains a second number of fiber optic strands, wherein said first number and said second number are not the same;
said inner side of said first cable port is in optical communication with said first ends of said first set of said first number of fiber optic strands;
said inner side of said second cable port is in optical communication with said first ends of said second set of said second number of fiber optic strands;
said outer side of said first cable port is designed to accept a connector terminating a multi-fiber cable containing said first number of fiber optic strands; and
said outer side of said second cable port is designed to accept a connector terminating a multi-fiber cable containing said second number of fiber optic strands.

10. A launch cable assembly kit for testing a multi-fiber optic cable containing at least two fiber optic strands and terminating in a first connector, comprising:
at least one launch cable assembly, each of which comprises:
a housing;
a mandrel disposed within said housing;
at least one cable port comprising an inner side and an outer side, wherein said at least one cable port is disposed through said housing such that the first connector of the multi-fiber optic cable is able to be connected to said outer side of said at least one cable port, and said inner side of said at least one cable port is within said housing;
at least one fiber exit disposed in said housing; and
at least one set of at least two fiber optic strands of at least twenty-five feet in length, wrapped around said mandrel within said housing, wherein each of said at least two fiber optic strands comprises a first end in optical communication with said inner side of said at least one cable port and a second end grouped together with each of said second ends of said at least two fiber optic strands such that each of said second ends of said at least two fiber optic strands terminates in a single second connector;
wherein said at least one set of at least two fiber optic strands extends through said at least one fiber exit such that said second connector is outside of said housing; and
wherein said at least two fiber optic strands are arranged in optical communication with said inner side of said at least one cable port such that when the first connector of the multi-fiber optic cable is connected to said outer side of said at least one cable port, light traveling through each of said at least two fiber optic strands will continue traveling through the at least two fiber optic strands within the multi-fiber optic cable connected to said outer side of said at least one cable port, and light traveling through each of the at least two fiber optic strands within the multi-fiber optic cable connected to said outer side of said at least one cable port will continue traveling through said at least two fiber optic strands; and at least one MPO switch comprising a switch port capable of accepting said second connector of said launch cable assembly.

11. The launch cable assembly kit as claimed in claim 10, wherein said at least one MPO switch further comprises software that allows a user to switch testing between the at least two fiber optic strands of the multi-fiber cable to be tested and a user interface that allows the user to control said software.

12. The launch cable assembly kit as claimed in claim 10, wherein said at least one launch cable assembly is two launch cable assemblies and said at least one MPO switch is two MPO switches.

13. The launch cable assembly kit as claimed in claim 12, wherein each of said two MPO switches further comprise software that allows a user to switch testing between the at least two fiber optic strands of the multi-fiber cable to be tested and allows communication between each of said two MPO switches; and a user interface that allows the user to control said software.

14. The launch cable assembly kit as claimed in claim 10, wherein each of said at least one MPO switch comprises an MPO switch input; and said kit further comprises:

at least one OTDR comprising an OTDR input; and at least one MPO-OTDR cable comprising an MPO switch connector and an OTDR connector, wherein said at least one MPO-OTDR cable is capable of connecting said at least one MPO switch and said at least one OTDR when said MPO switch connector is plugged into said MPO switch input and said OTDR connector is plugged into said OTDR input;

wherein when said at least one MPO switch and said at least one OTDR are connected, pulses emitted by said at least one OTDR travel through said at least one MPO-OTDR cable, said at least one MPO switch, said at least two fiber optic strands of said at least one launch assembly, and the at least two fiber optic strands of the multi-fiber optic cable.

15. The launch cable assembly kit as claimed in claim 14, wherein:
said at least one launch cable assembly is two launch cable assemblies;
said at least one MPO switch is two MPO switches;
said at least one MPO-OTDR cable is two MPO-OTDR cables; and
said at least one OTDR is two OTDRs.

16. The launch cable assembly kit as claimed in claim 15, wherein each of said two MPO switches further comprise software that allows a user to switch testing between the at least two fiber optic strands of the multi-fiber optic cable and allows communication between each of said two MPO switches; and a user interface that allows the user to control said software.

17. The launch cable assembly kit as claimed in claim 10, wherein said at least one MPO switch is integrated with an OTDR and pulses emitted by said at least one MPO switch integrated with said OTDR travel through said at least two fiber optic strands of said at least one launch assembly, and the at least two fiber optic strands of the multi-fiber optic cable.

18. The launch cable assembly kit as claimed in claim 17, wherein:
said at least one launch cable assembly is two launch cable assemblies; and
said at least one MPO switch integrated with an OTDR is two MPO switches integrated with OTDRs.

19. The launch cable assembly kit as claimed in claim 18, wherein each of said two MPO switches integrated with OTDRs further comprise software that allows a user to switch testing between the at least two fiber optic strands of the multi-fiber optic cable and allows communication between each of said two MPO switches integrated with OTDRs; and a user interface that allows the user to control said software.

* * * * *